(12) United States Patent
Heijl et al.

(10) Patent No.: US 11,149,116 B2
(45) Date of Patent: Oct. 19, 2021

(54) PROCESS FOR PRODUCING A POLYCARBONATE USING AN ORGANIC SOLVENT BASED ON CHLOROHYDROCARBONS

(71) Applicant: Covestro Deutschland AG, Leverkusen (DE)

(72) Inventors: Jan Heijl, Lokeren (BE); Erik Sluyts, Brasschaat (BE); Xiaoxin Yao, Shanghai (CN)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 22 days.

(21) Appl. No.: 16/772,925

(22) PCT Filed: Dec. 12, 2018

(86) PCT No.: PCT/EP2018/084579
§ 371 (c)(1),
(2) Date: Jun. 15, 2020

(87) PCT Pub. No.: WO2019/121248
PCT Pub. Date: Jun. 27, 2019

(65) Prior Publication Data
US 2021/0163679 A1 Jun. 3, 2021

(30) Foreign Application Priority Data

Dec. 18, 2017 (EP) ..................... 17207886
Nov. 23, 2018 (EP) ..................... 18208001

(51) Int. Cl.
B32B 25/16 (2006.01)
C08G 64/24 (2006.01)
C08G 64/40 (2006.01)

(52) U.S. Cl.
CPC .......... *C08G 64/24* (2013.01); *C08G 64/406* (2013.01)

(58) Field of Classification Search
USPC ........................................ 528/196, 198, 212
See application file for complete search history.

(56) References Cited

U.S. PATENT DOCUMENTS 4,262,111 A  4/1981  Hall et al.

FOREIGN PATENT DOCUMENTS

EP   0520272 A2   12/1992
WO   20150119981 A2  8/2015

OTHER PUBLICATIONS

International Search Report for International Patent Application No. PCT/EP2018/084579, dated Mar. 22, 2019.
Written Opinion for International Patent Application No. PCT/EP2018/084579, dated Mar. 22, 2019.

*Primary Examiner* — Terressa Boykin
(74) *Attorney, Agent, or Firm* — K&L Gates LLP

(57) ABSTRACT

The present invention relates to a process for producing a polycarbonate from a diphenol or two or more different diphenols and a carbonyl halide by the interfacial process. It is a feature of the process according to the invention that it is carried out on the basis of a chlorohydrocarbon or a mixture of a mixture of two or more chlorohydrocarbons using an organic solvent. An organic solvent is also provided.

13 Claims, 2 Drawing Sheets

Fig. 1 (inventive)
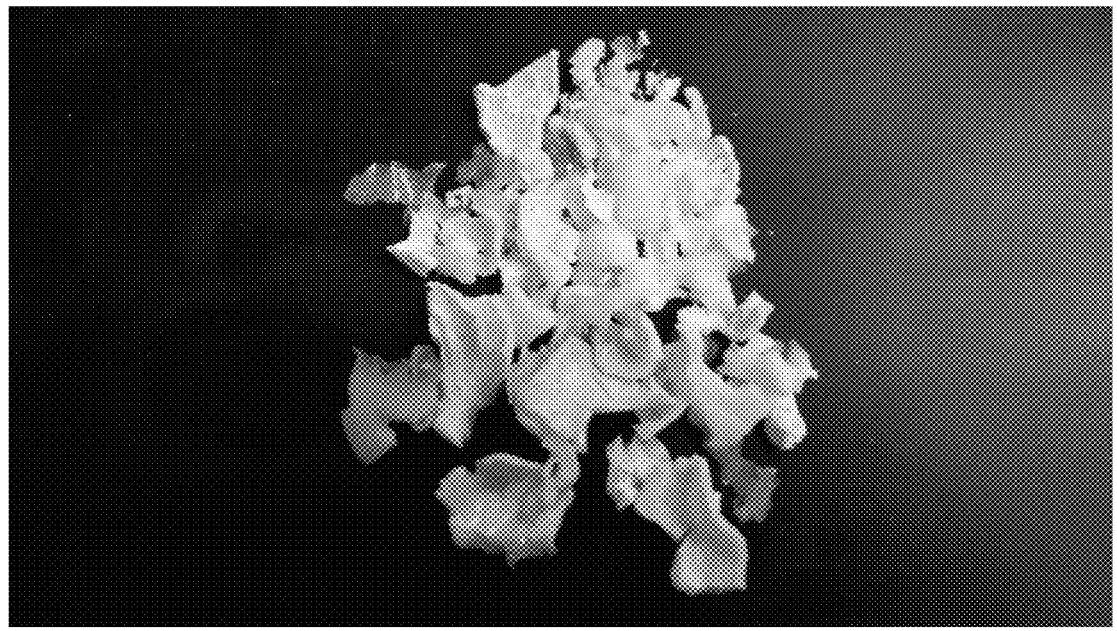

Fig. 2 (comparative example)
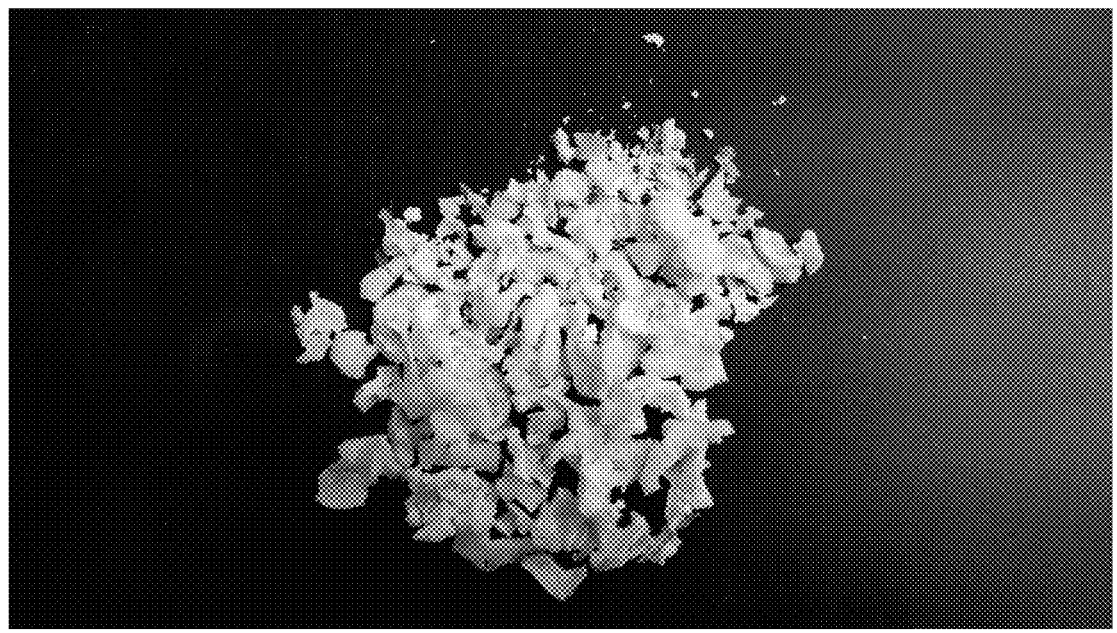

PROCESS FOR PRODUCING A POLYCARBONATE USING AN ORGANIC SOLVENT BASED ON CHLOROHYDROCARBONS

CROSS-REFERENCE TO RELATED APPLICATIONS

This application is a U.S. national stage application, filed under 35 U.S.C. § 371, of International Application No. PCT/EP2018/084579, which was filed on Dec. 12, 2018, and which claims priority to European Patent Application No. 18208001.0, which was filed on Nov. 23, 2018 and to European Patent Application No. 17207886.7 which was filed on Dec. 18, 2017. The contents of each are incorporated by reference into this specification.

FIELD

The present invention relates to a process for producing a polycarbonate from a diphenol or two or more different diphenols and a carbonyl halide by the interfacial process. It is a feature of the process according to the invention that it is carried out on the basis of a chlorohydrocarbon or a mixture of two or more chlorohydrocarbons using an organic solvent.

BACKGROUND

Polycarbonate production by the interfacial process has previously been described by Schnell, "Chemistry and Physics of Polycarbonates", Polymer Reviews, Volume 9, Interscience Publishers, New York, London, Sydney 1964, pages 33-70; D. C. Prevorsek, B. T. Debona and Y. Kesten, Corporate Research Center, Allied Chemical Corporation, Morristown, N.J. 07960: "Synthesis of Poly(ester Carbonate) Copolymers" in Journal of Polymer Science, Polymer Chemistry Edition, Vol. 18, (1980)"; pages 75-90, D. Freitag, U. Grigo, P. R. Müller, N. Nouvertne', BAYER AG, "Polycarbonates" in Encyclopedia of Polymer Science and Engineering, Volume 11, Second Edition, 1988, pages 651-692 and finally by Dres. U. Grigo, K. Kircher and P. R-Müller "Polycarbonate" in Becker/Braun, Kunststoff-Handbuch, volume 3/1, polycarbonates, polyacetals, polyesters, cellulose esters, Carl Hanser Verlag Munich, Vienna 1992, pages 118-145.

The interfacial process for producing polycarbonate is moreover also described in EP 0 517 044 A2 or EP 520 272 A2.

To produce polycarbonate by the interfacial process a disodium salt of a diphenol initially charged in aqueous alkaline solution or suspension or a mixture of two or more different diphenols initially charged in aqueous alkaline solution or suspension is in the presence of an inert organic solvent or solvent mixture reacted with a carbonyl halide, in particular phosgene, wherein the inert organic solvent/solvent mixture forms a second organic phase in addition to the aqueous phase. The incipient oligocarbonates primarily present in the organic phase are subjected to condensation with the aid of suitable catalysts to afford high molecular weight polycarbonates dissolved in the organic phase, wherein the molecular weight may be controlled by suitable chain terminators (monofunctional phenols). The organic phase is finally separated and the polycarbonate is isolated therefrom by various workup steps. For bisphenol A for example the reactions may be represented as follows:

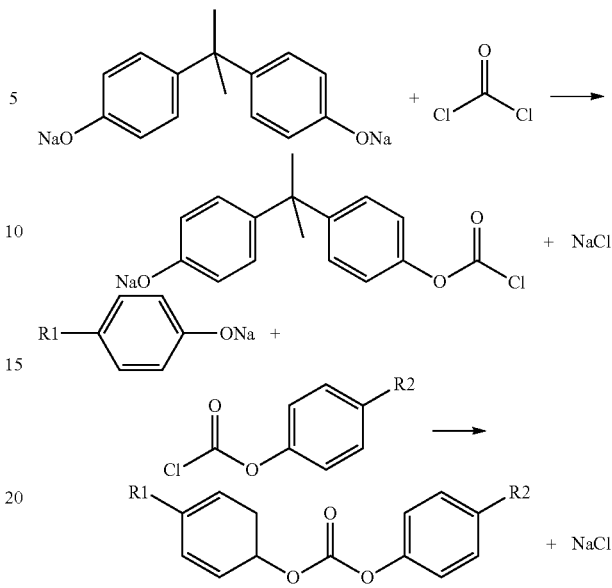

Wherein R1 and R2 may independently of one another represent growing polycarbonate chains or chain terminators.

Continuous processes for producing condensates using carbonyl halides, in particular phosgene,—for example the production of aromatic polycarbonates or polyestercarbonates or oligomers thereof—by the two-phase interfacial process generally have the disadvantage that acceleration of the reaction and/or improving the phase separation requires more phosgene to be employed than is necessary for the product balance. The phosgene excess is then decomposed in the synthesis in the form of byproducts—for example additional common salt or alkali metal carbonate compounds. The continuous two-phase interfacial process for producing aromatic polycarbonates typically employs phosgene excesses of around 20 mol % based on the added diphenoxide (cf. D. Freitag, U. Grigo, P. R. Müller, N. Nouvertne', BAYER AG, "Polycarbonates" in Encyclopedia of Polymer Science and Engineering, Volume 11, Second Edition, 1988, pages 651-692).

SUMMARY

Polycarbonates in the context of the present invention include not only homopolycarbonates but also copolycarbonates and/or polyestercarbonates; the polycarbonates may be linear or branched in known fashion. According to the invention, it is also possible to use mixtures of polycarbonates.

The thermoplastic polycarbonates including the thermoplastic aromatic polyestercarbonates have average molecular weights $M_w$ (determined by measuring the relative solution viscosity at 25° C. in $CH_2Cl_2$ and a concentration of 0.5 g per 100 ml of $CH_2Cl_2$) of 18 000 g/mol to 36 000 g/mol, preferably of 23 000 g/mol to 31 000 g/mol, in particular of 24 000 g/mol to 31 000 g/mol.

A portion, up to 80 mol %, preferably from 20 mol % to 50 mol %, of the carbonate groups in the polycarbonates used in accordance with the invention may have been replaced by aromatic dicarboxylic ester groups. Such polycarbonates, which contain both acid radicals of carbonic acid and acid radicals of aromatic dicarboxylic acids incorporated into the molecular chain, are referred to as aromatic polyestercarbonates. In the context of the present invention they are subsumed by the umbrella term "thermoplastic aromatic polycarbonates".

The polycarbonates are produced in known fashion from diphenols, carbonic acid derivatives, optionally chain terminators and optionally branching agents, and for the production of the polyestercarbonates a portion of the carbonic acid derivatives is replaced by aromatic dicarboxylic acids or derivatives of the dicarboxylic acids according to the extent to which the carbonate structural units are to be replaced by aromatic dicarboxylic ester structural units in the aromatic polycarbonates.

Dihydroxyaryl compounds suitable for producing polycarbonates are those of formula (1)

HO—Z—OH (1), in which

Z is an aromatic radical which has 6 to 30 carbon atoms and may contain one or more aromatic rings, may be substituted and may contain aliphatic or cycloaliphatic radicals or alkylaryls or heteroatoms as bridging elements.

It is preferable when Z in formula (2) is a radical of the formula (2)

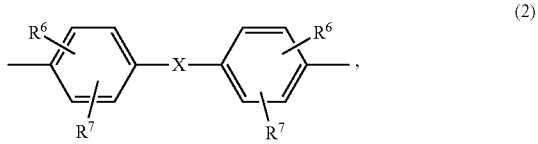

(2)

in which $R^6$ and $R^7$ independently of one another represent H, $C_1$— to $C_{18}$-alkyl-, $C_1$— to $C_{18}$-alkoxy, halogen such as Cl or Br or in each case optionally substituted aryl- or aralkyl, preferably H or $C_1$— to $C_{12}$-alkyl, particularly preferably H or $C_1$— to $C_8$-alkyl and very particularly preferably H or methyl, and X represents a single bond, —$SO_2$—, —CO—, —O—, —S—, $C_1$— to $C_6$-alkylene, $C_2$— to $C_5$-alkylidene or $C_5$— to $C_6$-cycloalkylidene, which may be substituted by $C_1$— to $C_6$-alkyl, preferably methyl or ethyl, or else represents $C_6$— to $C_{12}$-arylene which may optionally be fused to further heteroatom-containing aromatic rings.

It is preferable when X represents a single bond, $C_1$— to $C_5$-alkylene, $C_2$— to $C_5$-alkylidene, $C_5$— to $C_6$-cycloalkylidene, —O—, —SO—, —CO—, —S—, —$SO_2$— or a radical of formula (2a)

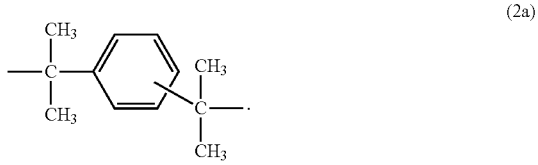

(2a)

Examples of diphenols (dihydroxyaryl compounds) are: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl)ethers, bis(hydroxyphenyl)ketones, bis(hydroxyphenyl)sulfides, bis(hydroxyphenyl)sulfones, bis(hydroxyphenyl)sulfoxides, 1,1'-bis(hydroxyphenyl)diisopropylbenzenes and the ring-alkylated and ring-halogenated compounds thereof.

Diphenols suitable for producing the polycarbonates to be used according to the invention are for example hydroquinone, resorcinol, dihydroxydiphenyl, bis(hydroxyphenyl)alkanes, bis(hydroxyphenyl)cycloalkanes, bis(hydroxyphenyl)sulfides, bis(hydroxyphenyl)ethers, bis(hydroxyphenyl)ketones, bis(hydroxyphenyl)sulfones, bis(hydroxyphenyl)sulfoxides, α,α'-bis(hydroxyphenyl)diisopropylbenzenes and alkylated, ring-alkylated and ring-halogenated compounds thereof.

Preferred diphenols are 4,4'-dihydroxydiphenyl, 2,2-bis(4-hydroxyphenyl)-1-phenylpropane, 1,1-bis(4-hydroxyphenyl)phenylethane, 2,2-bis(4-hydroxyphenyl)propane (also known as bisphenol A or BPA for short), 2,4-bis(4-hydroxyphenyl)-2-methylbutane, 1,3-bis[2-(4-hydroxyphenyl)-2-propyl]benzene (bisphenol M), 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,3-bis[2-(3,5-dimethyl-4-hydroxyphenyl)-2-propyl]benzene and 1,1-bis(4-hydroxyphenyl)-3,3,5-trimethylcyclohexane (also known as bisphenol TMC or BPTMC for short).

Particularly preferred diphenols are 4,4'-dihydroxydiphenyl, 1,1-bis(4-hydroxyphenyl)phenylethane, 2,2-bis(4-hydroxyphenyl)propane, 2,2-bis(3,5-dimethyl-4-hydroxyphenyl)propane, 1,1-bis(4-hydroxyphenyl)cyclohexane and 1,1-bis(4-hydroxyphenyl)-3,3,5-trimethylcyclohexane.

These and further suitable diphenols are described, for example, in U.S. Pat. Nos. 2,999,835 A, 3,148,172 A, 2,991,273 A, 3,271,367 A, 4,982,014 A and 2,999,846 A, in German laid-open specifications DE 1 570 703 A1, DE 2 063 050 A1, DE 2 036 052 A1, DE 2 211 956 A1 and DE 3 832 396 A1, in French patent specification FR 1 561 518 A1, in the monograph "H. Schnell, Chemistry and Physics of Polycarbonates, Interscience Publishers, New York 1964, p. 28 ff.; p. 102 ff.", and in "D. G. Legrand, J. T. Bendler, Handbook of Polycarbonate Science and Technology, Marcel Dekker New York 2000, pp. 72ff".

In the case of the homopolycarbonates only one diphenol is employed, while in the case of copolycarbonates two or more different diphenols are employed. The employed diphenol or the employed two or more different diphenols, similarly to all the other chemicals and auxiliaries added to the synthesis, may be contaminated with the impurities that originate from their own synthesis, handling and storage. However, it is desirable to use raw materials of the highest possible purity.

Any branching agents or branching agent mixtures to be used are added to the synthesis in the same manner. Compounds typically used are trisphenols, quaterphenols or acyl chlorides of tri- or tetracarboxylic acids, or else mixtures of the polyphenols or of the acyl chlorides.

Some of the compounds having three or more than three phenolic hydroxyl groups that are employable as branching agents are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tris(4-hydroxyphenyl)benzene, 1,1,1-tri(4-hydroxyphenyl)ethane, tris(4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl)methane.

Some of the other trifunctional compounds are 2,4-dihydroxybenzoic acid, trimesic acid, cyanuric chloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

The amount of the optionally employable branching agents is 0.05 mol % to 2 mol %, in turn based on moles of diphenols employed in each case, wherein the branching agents are initially charged with the diphenols.

All of these measures for producing polycarbonates are familiar to those skilled in the art.

Aromatic dicarboxylic acids suitable for the production of the polyestercarbonates are, for example, orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenyl sulfone dicarboxylic acid, 2,2-bis(4-carboxyphenyl)propane, trimethyl-3-phenylindane-4,5'-dicarboxylic acid.

Among the aromatic dicarboxylic acids, particular preference is given to using terephthalic acid and/or isophthalic acid.

Derivatives of dicarboxylic acids are dicarbonyl dihalides and dialkyl dicarboxylates, in particular dicarbonyl dichlorides and dimethyl dicarboxylates.

Replacement of the carbonate groups by the aromatic dicarboxylic ester groups proceeds essentially stoichiometrically and also quantitatively and the molar ratio of the reaction partners is therefore also reflected in the final polyestercarbonate. The aromatic dicarboxylic ester groups can be incorporated either randomly or blockwise.

In a continuous interfacial process for producing polycarbonates known from EP 0 304 691 A2 an aqueous phase of diphenols and the particular amount of alkali metal hydroxide necessary is combined with a phosgene-containing organic phase in a tube using a static mixer. The phosgene excess of 20 to 100 mol % is very high and the residence time in the reaction tube for the first reaction step is 10 to 75 s. This process can be used for producing only prepolymers having a molecular weight of 4000 to 12 000 g/mol. It must be followed by a further condensation using at least one catalyst in order to arrive at the desired molecular weight. Suitable catalysts are tertiary amines and onium salts. It is preferable to employ tributylamine, triethylamine and N-ethylpiperidine.

The employed amine catalyst may be open-chain or cyclic, particular preference being given to triethylamine and N-ethylpiperidine. The catalyst is preferably used as a 1% to 55% by weight solution.

Onium salts are to be understood here as meaning compounds such as $NR_4X$, wherein R may be an alkyl and/or aryl radical and/or H and X is an anion, for example a chloride ion, a hydroxide ion or a phenoxide ion.

The fully reacted at least biphasic reaction mixture containing at most only traces (<2 ppm) of aryl chlorocarbonates is allowed to settle out for the phase separation. The aqueous alkaline phase (reaction wastewater) is removed and the organic phase is extracted with dilute hydrochloric acid and water. The combined water phases are sent to the wastewater workup where solvent and catalyst proportions are removed by stripping or extraction and recycled. Subsequently, after adjusting to a certain pH of for example 6 to 8, for example by addition of hydrochloric acid, any remaining organic impurities, for example monophenol and/or unconverted diphenol/unconverted diphenols, are removed by treatment with activated carbon and the water phase is sent to chloralkali electrolysis.

In another variant of the workup the reaction wastewater is not combined with the washing phases but after stripping or extraction to remove solvents and catalyst residues is adjusted to a certain pH of for example 6 to 8, for example by addition of hydrochloric acid, and after removal of the remaining organic impurities, for example monophenol and/or unconverted diphenol or unconverted diphenols, by treatment with activated carbon is sent to chloralkali electrolysis.

After removing the solvent and catalyst proportions by stripping or extraction, the washing phases may optionally be sent back to the synthesis.

The carbonyl halide, in particular phosgene, may be used in liquid or gaseous form or dissolved in an inert solvent.

The production of phosgene from carbon monoxide and chlorine is known, for example from EP 0 881 986 A1, EP 1 640 341 A2, DE 332 72 74 A1, GB 583 477 A, WO 97/30932 A1, WO 96/16898 A1, or U.S. Pat. No. 6,713,035 B1.

Inert solvents which according to the prior art are usable with preference for the production of polycarbonates are solvents based on chlorohydrocarbons such as for example dichloromethane, the various dichloroethanes or chloropropane compounds, chlorobenzene or chlorotoluene or mixtures of two or more of these chlorohydrocarbons; toluene too may serve as an inert solvent in this context. It is preferable to employ an inert solvent based on dichloromethane or a mixture of dichloromethane and chlorobenzene. In the context of the present invention such inert solvents or mixtures of inert solvents are referred to collectively in the singular as "organic solvent" and in the plural as "organic solvents".

One disadvantage of the processes from the prior art is that the production of the polycarbonates requires the use of an organic solvent which has a very low content of impurities, i.e. which is of high purity, in order to be able to obtain polycarbonates meeting quality requirements.

Quality requirements dependent on the purity of the organic solvent are for example optical properties such as yellowness index (YI), visual impression, the residual amount of free diphenol, i.e. for example the residual amount of bisphenol A when bisphenol A is employed, and the efficiency of the end capping (phenolic OH). Both the residual amount of free diphenol (for example <10 ppm in the case of bisphenol A) and the content of phenolic OH end groups (<200 ppm) should be as low as possible.

In particular, the prevailing view in the prior art is that the presence of tetrachloromethane impairs the optical properties of polycarbonates. Accordingly, the content of tetrachloromethane should be kept as low as possible in the production of polycarbonates.

Thus WO 2015/119981 A2 discloses that the production of phosgene may produce $CCl_4$ as a byproduct which is introduced into the process for producing PC with the phosgene. WO 2015/119981 A2 also discloses that the content of tetrachloromethane in the phosgene used for producing polycarbonates should be not more than 10 ppm.

The content of chloroethane in the organic solvent for producing polycarbonates is also considered critical to the optical properties of the obtained polycarbonates.

However, providing organic solvents with the required high purities is costly and inconvenient. Thus these organic solvents require complex purification before use or production by special processes or higher-quality organic solvents must be employed or require more frequent replacement or at least purification upon contamination. This purification may be achieved for example by distillation which entails a high energy consumption. The impurities then have to be sent for disposal in special plants, for example by incineration, which is likewise costly and inconvenient, especially since environmental pollution is to be avoided. Costly plant shutdowns are also a frequent consequence when impurities in the organic solvent dictate that said solvent must be replaced.

The present invention accordingly has for its object to provide a process for producing polycarbonate in which in the reaction of a diphenol dissolved in the aqueous phase or two or more different diphenols dissolved in the aqueous phase with a carbonyl halide dissolved in an organic solvent to afford a polycarbonate dissolved in the organic solvent or two or more polycarbonates dissolved in the organic solvent it is possible to employ an organic solvent having an elevated content of chlorine-containing impurities, in particular an elevated content of carbon tetrachloride and/or chloroethane, without the optical and rheological properties of the polycarbonate being impaired. In particular, the yellowness index, the visual impression and the relative solution viscosity of the polycarbonate should not be impaired. The YI value shall preferably be not more than 2.0, particularly preferably not more than 1.5, very particularly preferably not more than 1.2. The visual impression tested by visual inspection of samples of polycarbonate produced according to the invention should be as good as that of samples of polycarbonate produced according to the prior art. In addition, the relative solution viscosity should be within the standard range.

It is a further object of the present invention to provide a process for producing polycarbonate in which plant shutdowns needed for replacement of the organic solvent may be undertaken less frequently compared to the prior art, or in which the organic solvent does not require costly and inconvenient purification during the process, or in which the organic solvent does not require partial removal and replacement by a solvent having a reduced content of chlorine-containing impurities, especially a reduced content of carbon tetrachloride and/or chloroethane, during the process.

It has now been found that, surprisingly, the object is achieved by a process according to claim 1.

The object is in particular achieved by employment in the production of polycarbonates of an organic solvent based on a chlorohydrocarbon or two or more chlorohydrocarbons and having a content of tetrachloromethane of 0.05% to 7% by weight and a content of chloroethane of 0.3% to 10% by weight.

The organic solvent is preferably a chlorohydrocarbon-based solvent selected from the group comprising methylene chloride, chlorobenzene, chloroform or mixtures of these chlorinated hydrocarbons.

The organic solvent according to the invention also comprises one or more other components, also referred to as secondary components. The secondary components are, without claim to completeness, for example water, toluene, styrene, methanol, benzene, o-xylene or tetrachloroethene.

In detail, the process according to the invention for producing polycarbonates by the interfacial process comprises at least the following steps:
(a) dissolving a diphenol or two or more different diphenols in an aqueous phase and dissolving a carbonyl halide in an organic solvent,
(b) reacting the diphenol dissolved in the aqueous phase or the two or more different diphenols dissolved in the aqueous phase with the carbonyl halide dissolved in the organic solvent to afford a polycarbonate dissolved in the organic solvent,
(c) supplying this polycarbonate dissolved in the organic solvent to step (d),
(d) removing the polycarbonate obtained in step (b) from the organic solvent and recycling the organic solvent to step (a),
wherein the organic solvent comprises the following components:

| | |
|---|---|
| methylene chloride | 0% to 99.65% by weight, |
| chlorobenzene | 0% to 99.65% by weight |
| chloroform | 0% to 99.65% by weight |
| chloroethane | 0.3% to 10% by weight, |
| tetrachloromethane | 0.05% to 7.0% by weight, |
| other components | 0% to 2.0% by weight, | wherein the sum of the contents of methylene chloride, chlorobenzene and chloroform is at least 81.00% by weight and at most 99.65% by weight, and wherein the sum of the contents of methylene chloride, chlorobenzene and chloroform plus the sum of the contents of chloroethane, tetrachloromethane and the other components is 100% by weight. The organic solvent always contains at least one component selected from the components methylene chloride, chlorobenzene and chloroform.

The polycarbonate obtained in step (b) may be obtained as a granulate or as a powder after further processing steps.

The sum of the contents of chloroethane, tetrachloromethane and other components in the organic solvent is thus at least 0.35% by weight and at most 19.0% by weight.

BRIEF DESCRIPTION OF THE DRAWINGS

The features and advantages of the examples, and the manner of attaining them, will become more apparent and the examples will be better understood by reference to the following description taken in conjunction with the accompanying drawings, wherein:

FIG. 1 shows a picture of a laboratory sample of polycarbonate; and

FIG. 2 shows a picture of a laboratory sample of polycarbonate.

Corresponding reference characters indicate corresponding parts throughout the several views. The exemplifications set out herein illustrate certain examples, in one form, and such exemplifications are not to be construed as limiting the scope of the examples in any manner.

DETAILED DESCRIPTION

It is preferable according to the invention when the content of methylene chloride relative to the sum of the contents of chlorobenzene and chloroform is at least 98.0% by weight to 99.999% by weight, preferably 99.0% by weight to 99.995% by weight.

It is alternatively preferable according to the invention when the sum of the contents of methylene chloride and chlorobenzene relative to the content of chloroform is at least 98.0% by weight to 99.999% by weight, preferably 99.0% by weight to 99.995% by weight.

The ratio of the content of methylene chloride relative to the content of chlorobenzene is from 40% by weight of methylene chloride:60% by weight of chlorobenzene to 60% by weight of methylene chloride:40% by weight of chlorobenzene, preferably 45% by weight of methylene chloride:55% by weight of chlorobenzene to 55% by weight of methylene chloride:45% by weight of chlorobenzene,
particularly preferably 48% by weight of methylene chloride:52% by weight of chlorobenzene to 52% by weight of methylene chloride:48% by weight of chlorobenzene,
very particularly preferably 49% by weight of methylene chloride:51% by weight of chlorobenzene to 51% by weight of methylene chloride:49% by weight of chlorobenzene, in particular 50% by weight of methylene chloride:50% by weight of chlorobenzene.

It is also preferable according to the invention when the content of chloroethane in the organic solvent is from 0.9% by weight to 8.0% by weight, preferably from 2.0% by weight to 7.0% by weight, particularly preferably from 2.5% by weight to 6.0% by weight.

It is additionally preferable according to the invention when the content of tetrachloromethane in the organic solvent is from 0.2% by weight to 7.0% by weight, preferably from 0.5% by weight to 6.0% by weight, particularly preferably from 1.0% by weight to 4.0% by weight.

It is especially preferable according to the invention when in the organic solvent the content of chloroethane is from 0.9% by weight to 8.0% by weight and the content of tetrachloromethane is from 0.2% by weight to 7.0% by weight,
preferably the content of chloroethane is from 2.0% by weight to 7.0% by weight and the content of tetrachloromethane is from 0.5% to 6.0% by weight,
particularly preferably the content of chloroethane is from 2.5% by weight to 6.0% by weight and the content of tetrachloromethane is from 1.0% by weight to 4.0% by weight.

For all of the abovementioned cases the sum of the contents of methylene chloride, chlorobenzene and chloroform plus the sum of the contents of chloroethane, tetrachloromethane and the other components is 100% by weight.

The process according to the invention preferably has the further feature that after the removal of the obtained polycarbonate from the organic solvent in step (d) the organic solvent is sent back to step (a) without further removal of liquid or gaseous constituents.

The obtained polycarbonate and the organic solvent may be separated from one another by various processes in step (d).

Thus the obtained polycarbonate and the organic solvent may be separated from one another when the obtained polycarbonate dissolved in the organic solvent is added to a further solvent, wherein the obtained polycarbonate has poorer solubility in this further solvent than in the organic solvent so that the obtained polycarbonate precipitates out of the solution and may be removed. Such a removal is described for example in EP 1339775 A1, EP 0488190 A1, EP 0095670 A2, EP 116836 A2. This generally affords the polycarbonate in the form of a powder.

The obtained polycarbonate and the organic solvent may alternatively be separated from one another when in step (d) the organic solvent is removed by multi-stage heating and decompression, optionally in combination with vented extruders and/or extrudate evaporators and/or foam evaporators. Such a removal is described for example in EP 1094873 A1, EP 1088019 A2, EP 2081975 A1, EP 1165302 A1, EP 03166771 A1, EP 1740638 A1, EP 1265944 A1, EP 1242156 A1. This generally affords the polycarbonate in the form of a granulate.

The obtained polycarbonate and the organic solvent may alternatively be separated from one another when in step (d) the organic solvent is removed by spray drying with a carrier gas, in particular steam or nitrogen. Such a removal is described for example in WO 2002044245 A1, EP 0256003 A1, EP 0003996 A1, EP 0616002 A1, EP 0783011 A2. This generally affords the polycarbonate in the form of a powder.

The process according to the invention preferably has the further feature that after the removal of the polycarbonate obtained in step (b) from the organic solvent in step (d) only components having a boiling point greater than 135° C. at standard pressure (1013.25 hPa) are removed from the organic solvent without removal of components having a boiling point of less than or equal to 135° C. at standard pressure (1013.25 hPa), wherein the components having a boiling point of less than or equal to 135° C. at standard pressure (1013.25 hPa) are sent back to step (a) and the components having a boiling point of greater than 135° C. at standard pressure (1013.25 hPa) are sent for incineration or other disposal.

The process according to the invention has the further feature that the organic solvent is recycled in a circuit that is closed in respect of this solvent. The mass of the solvent is thus not increased during performance of the process and is preferably kept constant.

It is preferable according to the invention when 100% or less, preferably 70% or less, particularly preferably 50% or less, very particularly preferably 30% or less of the organic solvent is replaced or purified only after a time period in which per part by mass of organic solvent 500 to 7500, preferably 1000 to 5000, particularly preferably 1250 to 3000, parts by mass of the polycarbonate are produced according to steps (a) to (d).

This makes it possible for the time between two plant shutdowns for replacing the organic solvent to be more than doubled compared to the prior art.

It is preferable according to the invention as an alternative or in addition
when not more than a proportion of 20% by weight, preferably not more than a proportion of 10% by weight, particularly preferably not more than a proportion of 5% by weight, very particularly preferably not more than a proportion of 2% by weight, especially preferably not more than a proportion of 1% by weight,
of the organic solvent is removed from the solvent and is simultaneously replenished with an amount of a solvent mixture corresponding to the removed proportion of organic solvent and comprising one or more components selected from methylene chloride, chlorobenzene and chloroform over a time period in which per part by mass of organic solvent 500 to 7500, preferably 1000 to 5000, particularly preferably 1250 to 3000, parts by mass of the polycarbonate are produced according to steps (a) to (d). It is preferred according to the invention when the mixing ratio of methylene chloride to chlorobenzene to chloroform of the solvent mixture that is re-added corresponds to the mixing ratio of methylene chloride to chlorobenzene to chloroform of the organic solvent which was present at the start of the time period.

In this way on the one hand the time between two plant shutdowns is further lengthened compared to the prior art and on the other hand the amount of replaced impurified organic solvent is kept very low.

In a preferred variant the process according to the invention is characterized in that after the removal of the polycarbonate obtained in step (b) from the organic solvent in step (d) the organic solvent is sent back to step (a) without further purification. In particular the organic solvent is not subjected to purification by a further distillation for removal of liquid or gaseous constituents, in particular of tetrachloromethane or chloroethane, or to another process for removal of liquid or gaseous constituents, in particular of tetrachloromethane or chloroethane. However, purification of the organic solvent of solids by means of sieves or filters is possible.

Alternatively or in addition the process according to the invention is further characterized in that in step (a) the molar excess of the carbonyl halide relative to the molar proportion of the one diphenol or of the sum of the molar proportions of the two or more different diphenols is from 8% to 30%, preferably from 10% to 20%, particularly preferably from 11% to 14%.

Alternatively or in addition the process according to the invention is characterized in that in step (a) the content of the diphenol or the sum of the contents of the two or more different diphenols in the aqueous phase is from 10% to 20% by weight, preferably 14% to 18% by weight, particularly preferably 15% to 16% by weight.

Alternatively or in addition the process according to the invention is characterized in that the aqueous phase is aqueous alkali metal or alkaline earth metal hydroxide solution.

Alternatively or in addition the process according to the invention is characterized in that the pH in step (a) in the aqueous phase is from 10.0 to 13.0, preferably 11.0 to 12.0, particularly preferably 11.3 to 11.8.

Alternatively or in addition the process according to the invention is characterized in that in step (c) the content of the poly carbonate in the organic solvent is from 10% to 30% by weight, preferably 12% to 25% by weight, particularly preferably 14% to 20% by weight.

Alternatively or in addition the process according to the invention is characterized in that the carbonyl halide is selected from the group comprising: a carbonyl dihalide, diphosgene, triphosgene, preferably a carbonyl dihalide, particularly preferably phosgene.

The polycarbonates produced by the process according to the invention exhibit an inherent colour of the mouldings produced from these polycarbonates by injection moulding which is just as good as the inherent colour of injection mouldings made of polycarbonates produced by prior art processes. This inherent colour of transparent freshly injection moulded mouldings is characterized by a very low yellowness which is determined by the so-called "Yellowness Index" (Y.I.) according to ASTM E313 on injection moulded plates of defined thickness. All reported values for the Y.I. of the polycarbonates relate to this method of determination. The YI values of the polycarbonates produced according to the invention are not more than 2.0, preferably not more than 1.5.

The polycarbonates produced by the process according to the invention also have relative solution viscosities which are just as good and standard-conformant as polycarbonates produced by prior art processes. These standard relative solution viscosities are in the range from 15 to 40, preferably from 20 to 35. The relative solution viscosity was determined by measurement using a Lauda Ubbelohde viscometer of the type Proline PV24 at 25° C. in $CH_2Cl_2$ and at a concentration of 0.5 g of polycarbonate per 100 ml of $CH_2Cl_2$.

The present invention thus further provides a polycarbonate produced by the process according to the invention. This polycarbonate inter alia features a YI of not more than 2.0, preferably of not more than 1.5. The polycarbonate according to the invention is also characterized in that it has relative solution viscosities of 15 to 40, preferably of 20 to 35.

The invention further relates also to an organic solvent suitable for performing the process according to the invention. This organic solvent comprises the following components:

| | |
|---|---|
| methylene chloride | 0% to 99.65% by weight, |
| chlorobenzene | 0% to 99.65% by weight, |
| chloroform | 0% to 99.65% by weight, |
| chloroethane | 0.3% to 10% by weight, |
| tetrachloromethane | 0.05% to 7.0% by weight, |
| other components | 0% to 2.0% by weight, | wherein the sum of the contents of methylene chloride, chlorobenzene and chloroform is at least 81.00% by weight and at most 99.65% by weight
and wherein the sum of the contents of methylene chloride, chlorobenzene and chloroform plus the sum of the contents of chloroethane, tetrachloromethane and the other components is 100% by weight. This organic solvent always contains at least one component selected from the components methylene chloride, chlorobenzene and chloroform.

The sum of the contents of chloroethane, tetrachloromethane and other components in the organic solvent is thus at least 0.35% by weight and at most 19.0% by weight.

According to the invention the content of methylene chloride relative to the sum of the contents of chlorobenzene and chloroform is at least 98.0% by weight to 99.999% by weight, preferably 99.0% by weight to 99.995% by weight.

It is alternatively preferable according to the invention when the sum of the contents of methylene chloride and chlorobenzene relative to the chloroform content is at least 98.0% by weight to 99.999% by weight, preferably 99.0% by weight to 99.995% by weight.

The ratio of the content of methylene chloride relative to the content of chlorobenzene is from 40% by weight of methylene chloride:60% by weight of chlorobenzene to 60% by weight of methylene chloride:40% by weight of chlorobenzene,
preferably from 45% by weight of methylene chloride:55% by weight of chlorobenzene to 55% by weight of methylene chloride:45% by weight of chlorobenzene,
particularly preferably from 48% by weight of methylene chloride:52% by weight of chlorobenzene to 52% by weight of methylene chloride:48% by weight of chlorobenzene,
very particularly preferably from 49% by weight of methylene chloride:51% by weight of chlorobenzene to 51% by weight of methylene chloride:49% by weight of chlorobenzene, in particular 50% by weight of methylene chloride: 50% by weight of chlorobenzene.

It is also preferable according to the invention when the content of chloroethane in the organic solvent is from 0.9% by weight to 8.0% by weight, preferably from 2.0% by weight to 7.0% by weight, particularly preferably from 2.5% by weight to 6.0% by weight.

It is additionally preferable according to the invention when the content of tetrachloromethane in the organic solvent is from 0.2% by weight to 7.0% by weight, preferably from 0.5% by weight to 6.0% by weight, particularly preferably from 1.0% by weight to 4.0% by weight.

It is especially preferable according to the invention when in the organic solvent the content of chloroethane is from 0.9% by weight to 8.0% by weight and the content of tetrachloromethane is from 0.2% by weight to 7.0% by weight, preferably the content of chloroethane is from 2.0% by weight to 7.0% by weight and the content of tetrachloromethane is from 0.5% to 6.0% by weight, particularly preferably the content of chloroethane is from 2.5% by weight to 6.0% by weight and the content of tetrachloromethane is from 1.0% by weight to 4.0% by weight.

For all of the abovementioned cases the sum of the contents of methylene chloride, chlorobenzene and chloroform plus the sum of the contents of chloroethane, tetrachloromethane and the other components is 100% by weight.

Such an organic solvent is obtainable without costly and complex purification and is cheaper than organic solvents having lower contents of chloroethane or tetrachloromethane. However, it is just as suitable as organic solvents having lower contents of chloroethane or tetrachloromethane for the production of polycarbonates having good optical properties, in particular of polycarbonates having a YI of not more than 2.0, preferably of not more than 1.5.

The invention also provides for the use of the organic solvent according to the invention for producing polycarbonates by the interfacial process.

The present invention is illustrated by reference to examples below without the invention being limited to these examples.

The experiments described hereinbelow were carried out in a continuously operated plant for producing polycarbonate by the interfacial process.

Examples 1-2, Continuous Laboratory Production of Polycarbonate

The laboratory tests were performed in a continuous mode in a combination of pumps and stirred reactors. In all experiments 65.8 g/h of gaseous phosgene were dissolved in a T-piece in 772 g/h of organic solvent (for composition see table 1) at −7° C. The amount of solvent was calculated such that at the end of the reaction a 15% by weight polycarbonate solution was obtained. The continuously supplied phosgene solution was contacted in a further T-piece with 912 g/h of a 15% by weight aqueous alkaline BPA solution (2 mol of NaOH per mol of BPA) which had been preheated to 30° C. This BPA solution was dispersed in the phosgene solution via a stainless steel filter (pore size 60 µm). The reaction mixture was passed into a Fink HMR040 mixing pump temperature-controlled to 25° C. until at the end of the reaction pump all of the phosgene had reacted. Downstream of this pump 3.29 g/h of p-tert-butylphenol were added as chain terminator as a 3% by weight solution in the above-mentioned solvent mixture and in a further HMR040 pump at 25° C. the resulting mixture was reacted with 28.32 g/h of 32% by weight sodium hydroxide solution.

Downstream thereof were two glass stirred tanks from Tectrion GmbH run in flooded mode and having baffles made of stainless steel with a 600 second residence time and accordingly two gear pumps for conveying and dispersing of the reaction mixture. Added to the second stirred tank were 0.679 g/h of the catalyst (10% by weight of N-ethylpiperidine dissolved in pure chlorobenzene). At the end of the reaction the pH of the reaction was about 11.5.

In this way 156 g/h of polycarbonate in organic solution together with the aqueous phase from the reaction were continuously passed to a phase separation vessel in order to remove this aqueous phase. The polycarbonate solution was washed with 10% by weight of HCl and then dried.

The obtained polycarbonate had the following characteristics: relative solution viscosity 27/phenolic OH end groups 155 [ppm]/DPC<2 [ppm]/BPA 2 [ppm]/phenol 2 [ppm]. The reactivity of the system is determined by means of the residual amount of free bisphenol A and the efficiency of the end capping (phenolic OH). No effect of the solvent composition on these qualitative parameters was detectable.

The YI values of the polycarbonates as a function of the organic solvents used in the production of the poly carbonates are reported in Table 1.

Examples 3-9, Continuous Production of Poly Carbonate

To determine the effect of the solvent and of the running of the process regime according to the above-described conditions, further experiments were determined in a variety of large industrial scale plants and both process stability and product quality were determined.

Employed as the aqueous phase for the Examples 3-9 was an aqueous BPA solution having an NaOH:BPA molar ratio of 2.03. The employed solvent for the organic phase was in each case a mixture as reported in Table 2, to which phosgene was added. The reaction partners were dispersed through a nozzle and the nozzle was preset to produce an oil-in-water dispersion. The reaction temperature was set to 40° C. by means of a cooler in the recirculation loop of a tank reactor and using an NaOH addition in a delay reactor the pH was adjusted such that it was 11.5 at the end of the reaction. The chain length was adjusted by addition of p-tert-butylphenol in a first delay reactor and, to react residual amounts of reactive chlorine end groups, N-ethylpiperidine was added as catalyst in a second delay reactor. For comparability of the experiments on industrial plants of different sizes the addition amounts are reported per 10 000 kg of bisphenolate solution.

The following solutions were employed:

Aqueous bisphenolate solution (15.55% by weight of BPA based on the total weight of the solution, 2.03 mol of aqueous sodium hydroxide solution/mol of BPA);

32% by weight of aqueous NaOH solution;

15% by weight of p-tert-butylphenol solution in the solvent mixture from Table 2, as catalyst solution: 7.5% by weight of N-ethylpiperidine in methylene chloride.

The addition amounts were typically as follows:

10 000 kg of BPA solution, 767 kg of phosgene, 7960 kg of solvent, 465 kg of NaOH solution, 286 kg of p-tert-butylphenol solution, 182 kg of N-ethylpiperidine solution.

It is clearly apparent that the polycarbonate produced in accordance with the invention has exceptional YI values. The laboratory samples from the Examples 1 and 2 were visually assessed and are reported in FIGS. 1 and 2.

TABLE 1

| Example | Chlorobenzene (% by weight) | Methylene chloride (% by weight) | Chloroethane (% by weight) | Carbon tetrachloride (% by weight) | Optical quality | BPA (ppm) | OH (ppm) |
|---|---|---|---|---|---|---|---|
| 1 | 50.00 | 50.00 | 0.00 | 0.00 | visually | <2 | 155 |
| 2 | 45.00 | 45.00 | 6.00 | 4.00 | visually | <2 | 150 |

TABLE 2

| Example | Chlorobenzene (% by weight) | Methylene chloride (% by weight) | Chloroethane (% by weight) | Carbon tetrachloride (% by weight) | YI | BPA (ppm) | OH (ppm) |
|---|---|---|---|---|---|---|---|
| 3 | 49.44 | 49.44 | 1.07 | 0.05 | 1.03 | 5 | 127 |
| 4 | 49.43 | 49.43 | 1.06 | 0.08 | 0.91 | 3 | 103 |
| 5 | 49.56 | 49.56 | 0.82 | 0.31 | 0.76 | 7 | 122 |
| 6 | 49.60 | 49.60 | 2.37 | 0.59 | 1.24 | 4 | 140 |
| 7 | 49.57 | 49.58 | 2.20 | 0.64 | 1.05 | 5 | 111 |
| 8 | 44.06 | 54.11 | 1.22 | 0.61 | 1.13 | 4 | 87 |
| 9 | 43.10 | 55.20 | 1.50 | 0.20 | 1.31 | <2 | 48 |

The invention claimed is:

1. A process for producing a polycarbonate by the interfacial process comprising at least the following steps:
   (a) dissolving a diphenol or two or more different diphenols in an aqueous phase and dissolving a carbonyl halide in an organic solvent,
   (b) reacting the diphenol dissolved in the aqueous phase or the two or more different diphenols dissolved in the aqueous phase with the carbonyl halide dissolved in the organic solvent to afford a polycarbonate dissolved in the organic solvent,
   (c) supplying this polycarbonate dissolved in the organic solvent to step (d),
   (d) removing the polycarbonate obtained in step (b) from the organic solvent and recycling the organic solvent to step (a),
   wherein the organic solvent comprises the following components:

| | |
|---|---|
| methylene chloride | 0% to 99.65% by weight, |
| chlorobenzene | 0% to 99.65% by weight, |
| chloroform | 0% to 99.65% by weight, |
| chloroethane | 0.3% to 10% by weight, |
| tetrachloromethane | 0.05% to 7.0% by weight, and |
| other components | 0% to 2.0% by weight, | wherein the sum of the contents of methylene chloride, chlorobenzene and chloroform is at least 81.00% by weight and at most 99.65% by weight,
   and wherein the sum of the contents of methylene chloride, chlorobenzene and chloroform plus the sum of the contents of chloroethane, tetrachloroethane and the other components is 100% by weight.

2. The process according to claim 1, wherein the content of chloroethane in the organic solvent is from 0.9% by weight to 8.0% by weight.

3. The process according to claim 1, wherein the content of tetrachloromethane in the organic solvent is from 0.2% by weight to 7.0% by weight.

4. The process according to claim 2, wherein in the organic solvent:
   the content of chloroethane is from 0.9% by weight to 8.0% by weight, and the content of tetrachloromethane is from 0.2% by weight to 7.0% by weight.

5. The process according to claim 1, wherein in step (d) the organic solvent and the obtained polycarbonate are separated from one another when the obtained polycarbonate dissolved in the organic solvent is added to a further solvent, wherein the obtained polycarbonate has poorer solubility in this further solvent than in the organic solvent.

6. The process according to claim 1, wherein in step (d) the organic solvent is removed by multi-stage heating and decompression, optionally in combination with vented extruders and/or extrudate evaporators and/or foam evaporators.

7. The process according to claim 1, wherein in step (d) the organic solvent is removed by spray drying with a carrier gas.

8. The process according to claim 1, wherein after the removal in step (d) the organic solvent is sent back to step (a) without further removal of liquid or gaseous constituents.

9. The process according to claim 1, wherein after the removal in step (d) only components having a boiling point greater than 135° C. at standard pressure (1013.25 hPa) are removed from the organic solvent without removal of components having a boiling point of less than or equal to 135° C. at standard pressure (1013.25 hPa), wherein the components having a boiling point of less than or equal to 135° C. at standard pressure (1013.25 hPa) are sent back to step (a).

10. The process according to claim 1, wherein the organic solvent is recycled in a circuit that is closed in respect of this solvent, wherein the amount of the organic solvent is not increased during performance of the process,
    wherein 100% or less of the organic solvent is replaced or purified only after a time period in which per part by mass of organic solvent 500 to 7500 parts by mass of the polycarbonate are produced according to steps (a) to (d).

11. The process according to claim 1, wherein the organic solvent is recycled in a circuit that is closed in respect of this solvent, wherein the amount of the organic solvent is not increased during performance of the process,
    wherein not more than a proportion of 20%,
    of the organic solvent is removed from the solvent and is simultaneously replenished with an amount of a solvent mixture corresponding to the removed proportion of organic solvent mixture and comprising one or more components selected from methylene chloride, chlorobenzene and chloroform over a time period in which per part by mass of organic solvent 500 to 7500, parts by mass of the polycarbonate are produced according to steps (a) to (d).

12. An organic solvent suitable for producing polycarbonates according to claim 1, wherein the organic solvent has the following components:

| | |
|---|---|
| methylene chloride | 0% to 99.65% by weight, |
| chlorobenzene | 0% to 99.65% by weight, |
| chloroform | 0% to 99.65% by weight, |
| chloroethane | 0.3% to 10% by weight, |
| tetrachloromethane | 0.05% to 7.0% by weight, |
| other components | 0% to 2.0% by weight, | wherein the sum of the contents of methylene chloride, chlorobenzene and chloroform is at least 81.00% by weight and at most 99.65% by weight
and wherein the sum of the contents of methylene chloride, chlorobenzene and chloroform plus the sum of the contents of chloroethane, tetrachloroethane and the other components is 100% by weight.

13. A process comprising utilizing the organic solvent according to claim 12 for producing polycarbonates by the interfacial process.

\* \* \* \* \*